(No Model.) 2 Sheets—Sheet 2.
E. P. LYNN.
FILTER.

No. 521,591. Patented June 19, 1894.

UNITED STATES PATENT OFFICE.

ELMORE P. LYNN, OF CINCINNATI, OHIO.

FILTER.

SPECIFICATION forming part of Letters Patent No. 521,591, dated June 19, 1894.

Application filed July 27, 1893. Serial No. 481,598. (No model.)

*To all whom it may concern:*

Be it known that I, ELMORE P. LYNN, a citizen of the United States, residing at Cincinnati, in the county of Hamilton and State of Ohio, have invented certain new and useful Improvements in Filters, of which the following is a full, clear, and exact description, reference being had to the accompanying drawings, forming part of this specification.

My invention relates to that class of filters in which the water is forced through the filtering medium under pressure,—usually the pressure of the mains of a city water-works,—and it has for its object the provision of means whereby the filter is rendered self cleansing and automatic in its action without the necessity of removing or handling any of its parts.

The novelty of my invention will be hereinafter set forth and specifically pointed out in the claims.

Figure 1:
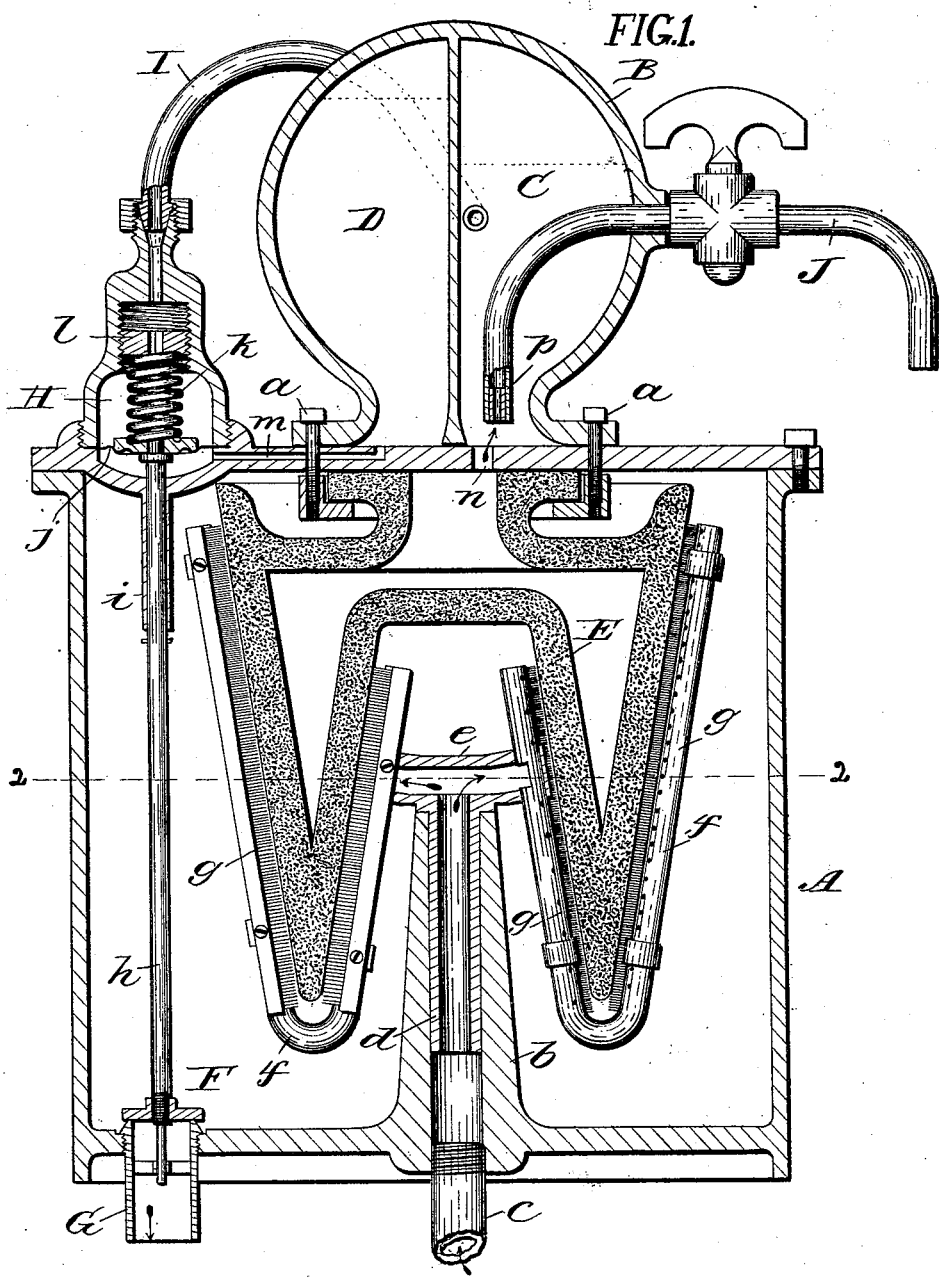
Figure 2:
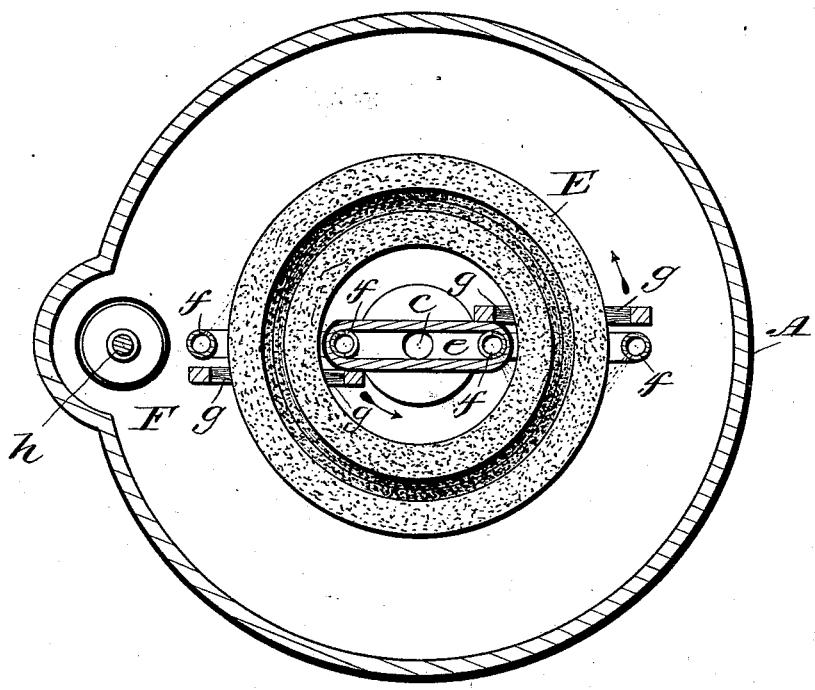

In the accompanying drawings:—Figure 1, is a central sectional elevation of a filter embodying my invention. Fig. 2, is a sectional plan view of the same on the dotted line 2 2 of Fig. 1.

The same letters of reference are used to indicate identical parts in both figures.

A is a tight metal vessel, in this instance cylindrical, on the top of which is a spherical chamber B divided into two compartments C and D. In my present construction the chamber B is separate from the vessel A and the bolts $a$ that serve to unite it to the vessel A also serve to secure and hold up the filtering medium E which is a frusto-conoidal filtering chamber of porous earthenware material with a frusto-conoidal cavity on its under side and a neck on its upper end engaged by a packed collar into which the screws $a$ enter to hold the filtering chamber in place and secure the chamber B on the vessel A, as is clearly shown. Extending centrally up through the bottom of the vessel A is a tubular boss $b$ into which the water to be filtered enters through a pipe $c$, and loosely journaled in this boss is a hollow sleeve $d$ having a horizontal pipe $e$ on its upper end to which at each end is attached a pipe $f$ bent to conform to the interior and exterior shape of the chamber E. The pipes $f$ are provided with perforations at an angle to the surface of the chamber E so that the water entering through the pipe $c$ and passing through the pipe $e$ and pipes $f$ is so directed, as indicated by the dotted lines in Fig. 2, against the chamber E as to cause the rotation of the pipes $f$ around said chamber both on its inner and outer sides, the action being substantially that of the old well known "Barker mill." Carried by and suitably secured to the pipes $f$ are brushes $g$ which normally are but slightly in contact, or even out of contact but in close proximity to the interior and exterior surfaces of the chamber E.

Within the vessel A is a valve F closing an exit pipe G for impure water and carried on a stem $h$ passing up into a chamber H through a sleeve $i$. The upper end of the stem $h$ within the chamber H is secured to a diaphragm $j$ to which is secured a disk held down by an adjustable coiled spring $k$ to normally hold the valve F closed. The tension of this spring is regulated by a hollow nut $l$ within a threaded bore of the chamber H. The upper end of the chamber H communicates by a pipe I with the compartment C and a port $m$ connects the lower part of the chamber H below the diaphragm $j$ with the compartment D which is a chamber for both water and compressed air. There is a passage $n$ from the neck of the chamber E through the top of the vessel A into the compartment C and J is the exit pipe for the filtered water from the compartment C.

In describing the operation of my filter thus constructed, I will assume that the pressure in the vessel A from the mains is forty pounds and that the pressure in the compartment C with the pipe J open is twenty pounds (the pipe J is properly restricted by a bush $p$ to maintain this proportion) and the pipes $f$ carrying their brushes are slowly revolved around the chamber E. The spring $k$ is so set that aided by the pressure, through the pipe I, above the diaphragm, the valve F will be held closed. The pressure in the compartment D owing to the looseness of fit of the stem $h$ in its guide $i$ will also be forty pounds. Under these conditions and pressures, the filter will continue at work filtering the water through the chamber E and out through the pipe J until such time as the filtering medium becomes clogged by the impurities of the water whereupon the pressure in the compartment C falls, say to eight or ten pounds. As the pressure in compartment C falls to this extent the spring $k$ can no longer hold down the diaphragm $j$ and the latter is raised thereby opening valve F and instantly reducing the pressure in vessel A to 0. The moment this occurs the pressure of the water entering through pipe $c$ forces up the pipes $e$ and $f$ and brushes $g$ which latter are brought into close contact with the surface of chamber E and revolving around it effectually clean it. At the same time by the opening of valve F, the pressure in compartment C being greater than that in the vessel A there is a reversal of the current of water through the filtering medium which materially aids in cleaning it and throwing off impurities. During the time that the pressure in the vessel A is forty pounds it is also forty pounds in the compartment D, with the air compressed therein, but when the pressure in the vessel A falls to nothing by the opening of the valve F, the pressure in the compartment D owing to the expansion of the compressed air gradually lessens by the escape of the water through the port $m$ and restricted passage between the stem $h$ and sleeve $i$, until the force of the spring $k$ overcomes said pressure and closes the valve F again. During the time between the opening and closing of the valve F the cleansing of the filtering medium is effected and when the valve F closes the brushes $g$ and pipes $f$ fall back from the filtering medium and again revolve slowly around the same. In this way the filter is rendered entirely automatic in its action and requires no attention after the spring $k$ is once adjusted.

While I prefer the use of the spring $k$, it is obvious that by giving sufficient stiffness to the diaphragm the spring $k$ might be dispensed with, and the same result obtained.

Having thus fully described my invention, I claim—

1. In a filter, the combination of a filtering vessel, an earthen-ware filtering partition therein, a valve in the filtering vessel opening to outside, a diaphragm chamber containing a diaphragm connected to said valve and communicating on one side through a restricted opening with an air chamber and the filtering vessel and on the opposite side with the chamber for filtered water, said chamber having a restricted outlet, substantially as described.

2. In a filter, the combination of a filtering vessel, an earthenware filtering partition therein, a chamber for the filtered water, a diaphragm chamber communicating on one side with the chamber for the filtered water and on its other side with an air chamber communicating through a restricted opening with the filtering vessel, and a valve in the filtering vessel actuated by the diaphragm, whereby the opening and closing of the valve is rendered automatic, substantially as described.

3. In a filter, the combination of a filtering vessel, an earthenware filtering partition therein, a chamber for the filtered water, a diaphragm chamber communicating on one side with the chamber for the filtered water and on its other side with an air chamber communicating through a restricted opening with the filtering vessel, a valve in the filtering vessel actuated by the diaphragm, and a spring for said diaphragm and valve, whereby the opening and closing of the valve is rendered automatic, substantially as described.

4. In a filter, the combination of a filtering vessel, an earthenware filtering partition therein, a cleaning device automatically actuated by the inflowing water and which is in close proximity to the surface of the filtering medium, and an automatically actuated valve the opening of which causes said cleaning device to press and revolve against said filtering medium when the same is clogged and requires cleaning, substantially as described.

5. In a filter, the combination of the vessel A, the earthenware partition E therein of the shape described, the hollow boss $b$, the sleeve $d$ loosely journaled therein and carrying the lateral pipe $e$ the pipes $f$ secured to the pipe $e$ and containing perforations, and the brushes $g$ carried by said pipes, substantially as described.

6. The herein described filter composed of the vessel A with valve F and hollow boss $b$, the filtering medium E of the shape described, the chamber B with the compartments C, D, the former communicating with the filtering medium and having a discharge pipe J, the diaphragm chamber H communicating by pipe I with the compartment C, the diaphragm $j$ in said chamber, the spring $k$ for said diaphragm, the valve stem $h$ connected to the diaphragm, the port $m$ between the compartment D and the diaphragm chamber, the loosely journaled sleeve $d$ carrying pipes $e$ and $f$, and the brushes $g$ carried by the pipes $f$, the whole constructed and operating in the manner and for the purpose specified.

ELMORE P. LYNN.

Witnesses:
J. THOMSON CROSS,
BERNARD J. HAUSFELD.